Sept. 21, 1926.   C. W. BHOSYS   1,600,709
APPARATUS FOR MAKING PHOTOGRAPHIC REPRODUCTIONS
Filed June 22, 1922   2 Sheets-Sheet 1

Inventor
Charles W. Bhosys
by Guid M. Saurdote
Attorney

Sept. 21, 1926.  
C. W. BHOSYS  
1,600,709

APPARATUS FOR MAKING PHOTOGRAPHIC REPRODUCTIONS

Filed June 22, 1922  2 Sheets-Sheet 2

Inventor  
Charles W. Bhosys  
by Guid M. Sacerdote  
Attorney

Patented Sept. 21, 1926.

1,600,709

UNITED STATES PATENT OFFICE.

CHARLES W. BHOSYS, OF NEW YORK, N. Y.

APPARATUS FOR MAKING PHOTOGRAPHIC REPRODUCTIONS.

Application filed June 22, 1922. Serial No. 570,274.

This invention relates to apparatus for making photographic reproductions, and more particularly to apparatus for holding and lighting pictures for the purpose of making photographic reproductions thereof; and its main object is to provide an apparatus for holding and lighting pictures to be reproduced, whereby good reproduction may be secured of even hopelessly faded pictures.

A further object of this invention is to provide an apparatus for holding and lighting pictures for the purpose of making photographic reproductions thereof, in which convenient means are provided for holding the picture to be reproduced, and for adjusting its position, and in which an improved and convenient distribution of light is secured.

With these and other objects in view, as will more fully appear as the description proceeds, this invention furthermore consists in certain novel and improved constructions and arrangements of parts, as will be hereinafter fully described, and claimed in the appended claims.

In another patent application entitled Method of lighting photographic subjects, filed June 22, 1922, Serial No. 570,273, I have mentioned the fact that in the use of electric bulbs for lighting the subject for the purpose of taking pictures thereof, if the subject be a person, when the bulb or bulbs used are disposed with their longitudinal axis in a substantially vertical direction, whether directed downwardly or upwardly, a reflection of the incandescent wire in the bulb or bulbs will be produced on the retinæ of the eyes of the subject; the picture being thus spoiled. The very same thing happens when the subject is a picture to be reproduced, and is therefore held in a clamping frame behind the surface of a glass pane; the glass surface showing a reflection of the incandescent wire if the bulb or bulbs are vertically disposed, said reflection causing the picture to come out blurred and not clear. On the other hand, if the bulb or bulbs are arranged with their axes in any other direction but vertical, this reflection will not take place, and satisfactory pictures will be obtainable.

For the reproduction of pictures however, and especially when the same are old and faded, there are other conditions which must be realized in order to obtain satisfactory results. In the methods ordinarily followed for the reproduction of pictures, the subject is usually exposed to the light of a powerful lamp held at a sufficient distance so as not to interfere in the field of the objective of the apparatus used for taking the picture. I have found that far better results are obtained by arranging a plurality of less powerful bulbs all around the subject, so as to produce a comparatively uniform illumination from all sides, said bulbs being held rather close to the subject itself. On the other hand, in order to obtain a clear picture, it will be necessary to place a screen in front of said bulbs, concealing the same from the objective of the picture taking apparatus, said screen having a central opening sufficient to expose the subject to said objective.

Old pictures and old daguerrotypes ordinarily have creases in different directions, which will appear in the reproduction, and which will call for difficult and costly retouching. I have found that a distribution of bulbs all around the subject, as mentioned above, corrects this condition to a certain extent; and that if the bulbs are arranged close to and at a certain angle in relation to the subject, this condition becomes corrected altogether, and on account of a good distribution of light from all sides thus achieved, the creases will positively not appear either to the eye, or in the reproduced picture. In order to realize this condition I have found that the best arrangement of the bulbs is obtained by placing the same with their longitudinal axes inclined to converge towards the space in front of the picture to be reproduced; the inclination of said bulbs to the plane of said picture being between twenty-five and seventy-five degrees, and preferably about forty to forty-five degrees.

In order to obtain a clear picture, as stated above, it is advantageous to arrange the electric bulbs all around the picture to be reproduced, so as to have the subject directly exposed to the light issuing therefrom and to conceal the glare of the same from the objective of the photographic apparatus by means of a screen; but I have found that the distribution of light will be still further considerably improved, and the employment of bulbs of a smaller capacity made possible, by actually enclosing said bulbs in a box-like structure, built in front of the picture to be reproduced, with an opening directly in front of the picture sufficient to expose the same to the action of the objective; and by painting the inside of said box with white varnish, or white enamel, apt to intensify the light and to render its distribution more diffused and uniform.

When such an arrangement is resorted to, the results obtainable are quite beyond the reach of the methods heretofore in use; since it is possible to obtain clear reproductions of old faded pictures which to the eye appear to be utterly undistinguishable, and which have heretofore been deemed impossible of reproduction.

The apparatus forming the subject of the present invention, embodies many features intended to realize the best conditions for making picture reproductions, as called for as the result of the observations above set forth; and in addition to the same it embodies other features, intended to facilitate an easy and rapid setting of the picture to be reproduced, and its adjustment in relation to the objective of the picture taking apparatus, and in relation to the sources of light.

The same is illustrated in the annexed drawings, in which.

Figures 1, 4:
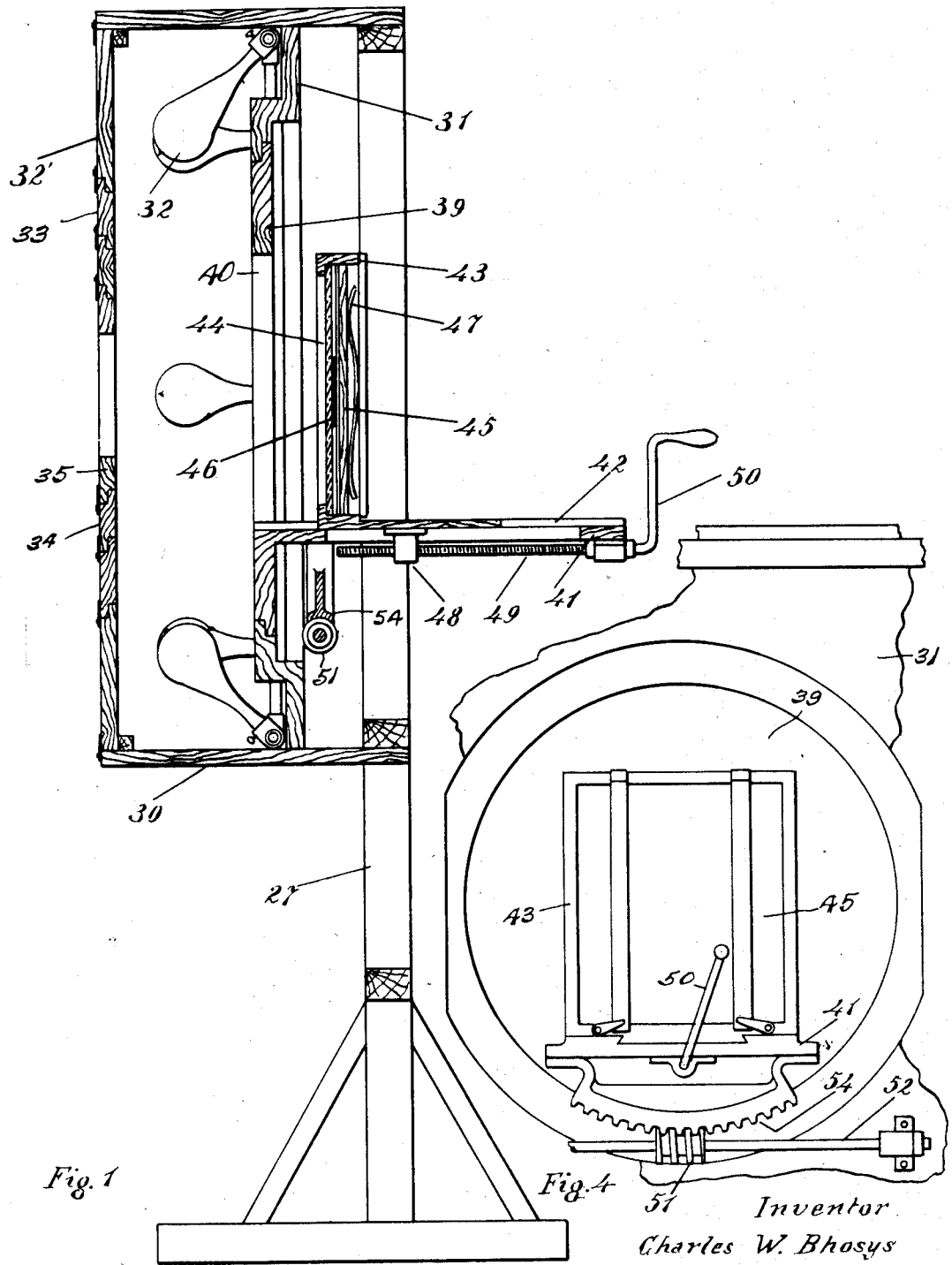
Fig. 1 is a side sectional view in elevation of my improved apparatus.
Figure 3:
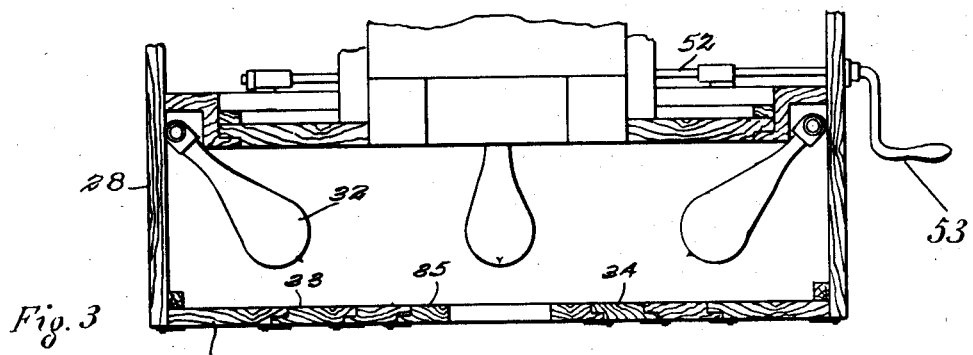
Fig. 3 is a plan sectional view of the same, partly broken away, through line AA of Fig. 2; and, Fig. 4 is a detail rear view in elevation showing the means of adjustment for the clamping frame of the apparatus shown in the other figures.
Figure 2:
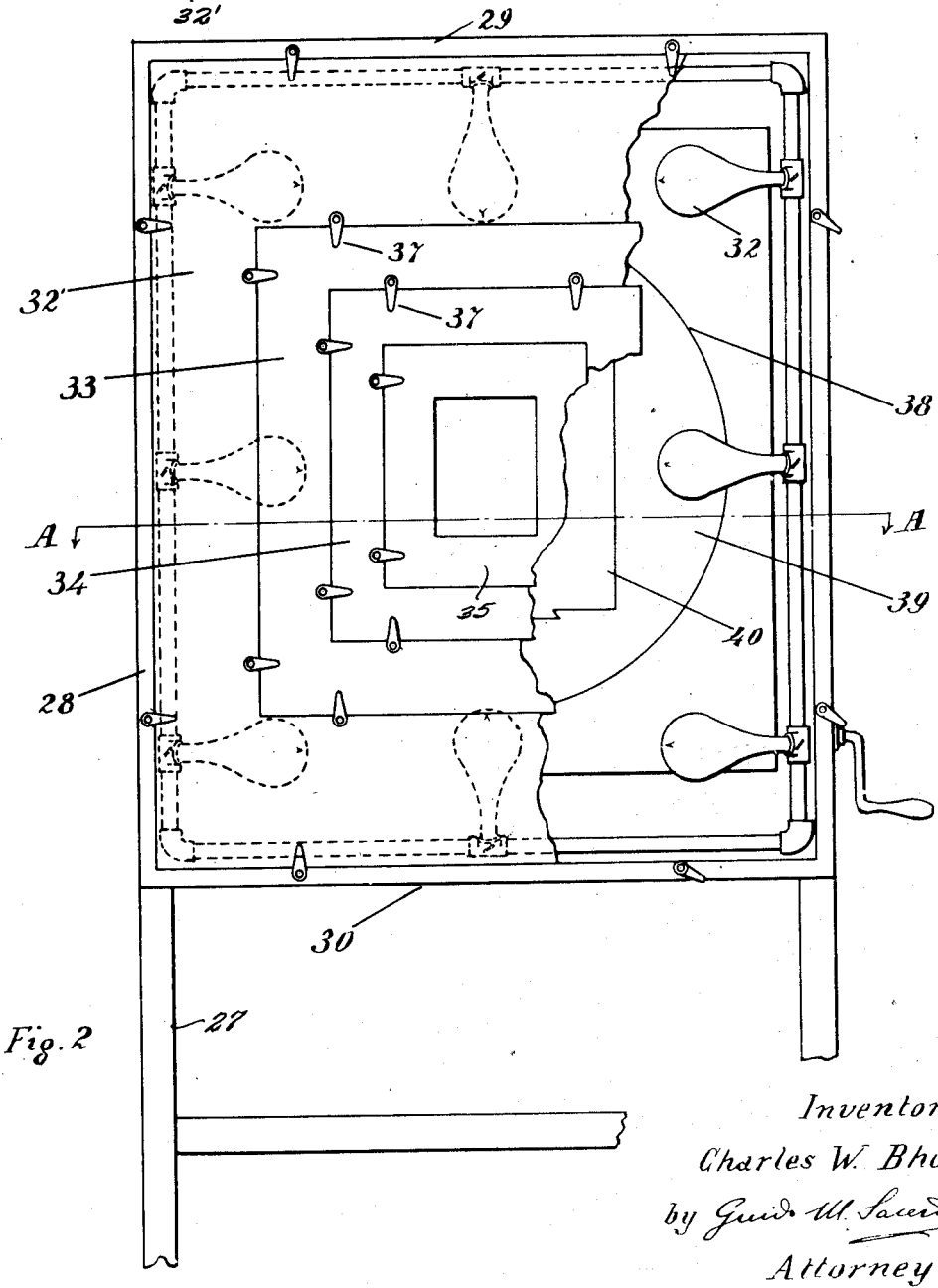
Fig. 2 is a front view in elevation of the same, partly broken away.

My apparatus consists of a stand 27, carrying a box-like structure comprising two sides 28, a top 29, and a bottom 30; a panel 31 carrying a plurality of electric bulbs 32 arranged in a rectangular series near its periphery, being mounted between said sides and top and bottom to constitute the rear of the box, and a panel 32′ being mounted in front to constitute the front part of the box. Electric bulbs 32 are inwardly inclined from the plane of panel 31, to converge towards the space in front of the central portion of said panel; and the inside of the box-like structure enclosing the same is preferably painted with white enamel, for the reasons stated above.

Panel 32′ is preferably formed of interlocking sections 32′, 33, 34, 35, fitting one inside of the other, so as to make the opening in said front panel adjustable by steps, according to the size of the picture to be reproduced; section 35 being provided with the smallest opening 36. Said panel sections may be secured in position in any convenient manner, for instance by means of clips 37.

Pictures to be reproduced may be mounted on panel 31 in any convenient manner; but it is well that means be provided for insuring the same remaining perfectly flat, and that means also be provided for adjustment of the same in a vertical and a horizontal plane. The adjustment in a vertical plane will make it easy to place the picture to be reproduced in line with the opening in the front panel; and the adjustment in a horizontal plane will provide means for adjusting the intensity of the light directed against said picture.

In order to achieve these results, I provide panel 31 with a central circular opening 38, in which is inserted and retained circular panel 39, so as to be rotatable around its center in a vertical plane. Said panel 39 is provided with a central rectangular opening 40, and is integral with an apron 41 horizontally extending towards the rear, formed with a dovetailed slot 42 from front to rear. In said slot is slidably inserted a clamping frame 43, of the ordinary type used for printing copies from negatives; said clamping frame being provided with a glass panel 44 and a foldable block 45 maintaining the picture 46 to be reproduced flat against the surface of glass 44 by means of pressure exerted by springs 47.

The lower portion of said clamping frame is provided with a lug 48, in which is inserted a screw 49 operated by a crank lever 50; and by means of the same, the clamping frame may be caused to move towards or away from the front of panel 39, thus exposing the picture 46 to a more or less intense illumination.

The lighting of the picture may of course also be regulated by shutting off one or more bulbs by means of their individual switches, though in the majority of cases it will be found advantageous to have all the bulbs lighted, in order to have light directed on the picture from all sides.

The adjustment of panel 39, and consequently of picture 46 in a vertical plane, may be effected by hand; but in order to insure stability of the system, I prefer to effect the same by means of a worm 51 carried by a shaft 52 operated by means of a crank lever 53, said worm being in mesh with a worm segment 54 attached to apron 41. In practice an adjustment of about sixty degrees, such as made possible by the worm segment shown, will be quite sufficient, since it is possible to clamp the picture in frame 43 at the center, and practically in the right position at the start; the adjustment being used only for the correction of small errors.

If a picture of large dimensions should have to be reproduced, beyond the capacity of frame 43 to hold, it is of course possible to hold the same against the front surface of panels 31, 39, by means of a suitable glass panel secured to the same in any convenient manner.

From the foregoing it is seen that I provide an apparatus for the exposure of pictures to be reproduced, which enables me to make use of artificial light to best advantage, and to secure the best possible results. It is obvious that the various details of construction of my apparatus may be varied to a considerable extent without departing from the spirit of my invention; and I therefore reserve myself the right to modify the construction of my device in such ways and manners as may be rendered advisable to satisfy requirements in different cases, and as may enter fairly into the scope of the appended claims.

I claim:

1. In a device of the class described, and in combination with means for holding a picture for the purpose of making a photographic reproduction thereof, means for effecting angular adjustment of the same on a vertical plane, and means mounted on said angular adjusting means for effecting translatory front to rear adjustment of said holding means.

2. Apparatus for exposing a picture for the purpose of making a photographic reproduction thereof, comprising means for holding a picture in position, a plurality of electric bulbs arranged around the same so that their front parts are directed to converge towards the space in front of said pictures, a box-like enclosure surrounding said picture and electric bulbs, having an adjustable opening in front for exposing said picture to the action of the apparatus used for making the reproduction, and means for vertical and horizontal adjustment of said picture holding means.

3. In an apparatus for exposing a picture for making photographic reproductions thereof, the combination with picture holding means, of a plurality of electric bulbs arranged at points close to the periphery of said picture holding means, directed away therefrom and converging toward the space in front of said picture holding means, said electric bulbs being of the type in which, for the same area of exposure of the picture surface, the light emanating from the sides of said bulb strikes said surface with greater intensity if the bulbs are inwardly inclined thereto than if the same are directed at right angles to said surface.

4. Apparatus for exposing a picture for the purpose of making a photographic reproduction thereof, comprising means for holding a picture in position, a plurality of electric bulbs arranged adjacent to the periphery thereof, directed away from said picture holding means and converging towards the space in front of the said picture holding means, said bulbs being of the type in which, for the same area of exposure of the picture surface, the light emanating from the sides of said bulbs strikes the said surface with greater intensity if the bulbs are inclined inwardly thereto, than if the same are directed at right angles to the said surface, and a box-like enclosure for said bulbs and holding means, having an opening in front adapted to expose a picture mounted in said holding means to the action of a photographic camera, while concealing said bulbs therefrom.

5. Apparatus for exposing a picture for the purpose of making a photographic reproduction thereof comprising a panel, picture holding means rotatably mounted in said panel, means for effecting angular adjustment of said picture holding means in a vertical plane, said picture holding means including a clamping frame, and means for moving said clamping frame toward and away from said panel in adjusted position with relation thereto.

CHARLES W. BHOSYS.